US 8,345,076 B2

(12) United States Patent
Massicot et al.

(10) Patent No.: US 8,345,076 B2
(45) Date of Patent: Jan. 1, 2013

(54) METHOD AND DEVICE FOR MARKING OBJECTS AND MATERIALS

(75) Inventors: Jean-Pierre Massicot, Rueil Malmaison Cedex (FR); Alain Foucou, Rueil Malmaison Cedex (FR); Zbigniew Sagan, Rueil Malmaison Cedex (FR); Hervé Soder, Saint Etienne (FR)

(73) Assignee: Advanced Track and Trace, Rueil-Malmaison (FR)

( * ) Notice: Subject to any disclaimer, the term of this patent is extended or adjusted under 35 U.S.C. 154(b) by 183 days.

(21) Appl. No.: 12/519,252

(22) PCT Filed: Dec. 14, 2007

(86) PCT No.: PCT/FR2007/002086
§ 371 (c)(1),
(2), (4) Date: Mar. 1, 2011

(87) PCT Pub. No.: WO2008/093006
PCT Pub. Date: Aug. 7, 2008

(65) Prior Publication Data
US 2011/0157294 A1 Jun. 30, 2011

(30) Foreign Application Priority Data
Dec. 14, 2006 (FR) ...................................... 06 10894

(51) Int. Cl.
*B41J 2/435* (2006.01)
(52) U.S. Cl. ...................................................... 347/224
(58) Field of Classification Search .................. 347/224, 347/225, 240, 251–254
See application file for complete search history.

(56) References Cited

U.S. PATENT DOCUMENTS

| 4,758,703 | A | 7/1988 | Drever |
| 7,705,946 | B2 * | 4/2010 | Hirota ........................... 349/141 |
| 2002/0153620 | A1 | 10/2002 | Guldi |
| 2005/0211680 | A1 * | 9/2005 | Li et al. .................... 219/121.68 |
| 2007/0192123 | A1 * | 8/2007 | Sagan et al. ...................... 705/1 |

FOREIGN PATENT DOCUMENTS

| FR | 2755902 | 5/1998 |
| FR | 2800896 | 5/2001 |
| WO | 0204223 | 1/2002 |
| WO | 03058544 | 7/2003 |

OTHER PUBLICATIONS

International Search Report dated Mar. 31, 2009, in PCT application.

* cited by examiner

*Primary Examiner* — Hai C Pham
(74) *Attorney, Agent, or Firm* — Young & Thompson

(57) ABSTRACT

A material marking method includes: generating a code; randomly selecting at least one area of the material; and marking by laser shot on the surface of, or inside the material in each the area of the material to represent the code there in a way that cannot be detected by the naked eye. Preferentially, the randomly selecting step is performed for each item of material to be marked. Preferentially, during the code generating step, a two-dimensional bar code is generated, and during the marking step, the two-dimensional bar code is represented. Preferably, the method includes marking the material in order to represent a mark visible to the naked eye, at least one part of a marking area of a mark visible to the naked eye is selected randomly and/or the visible mark bears an item of information representative of the position of at least one area where the code that cannot be detected by the naked eye is represented.

16 Claims, 4 Drawing Sheets

METHOD AND DEVICE FOR MARKING OBJECTS AND MATERIALS

Figure 1:
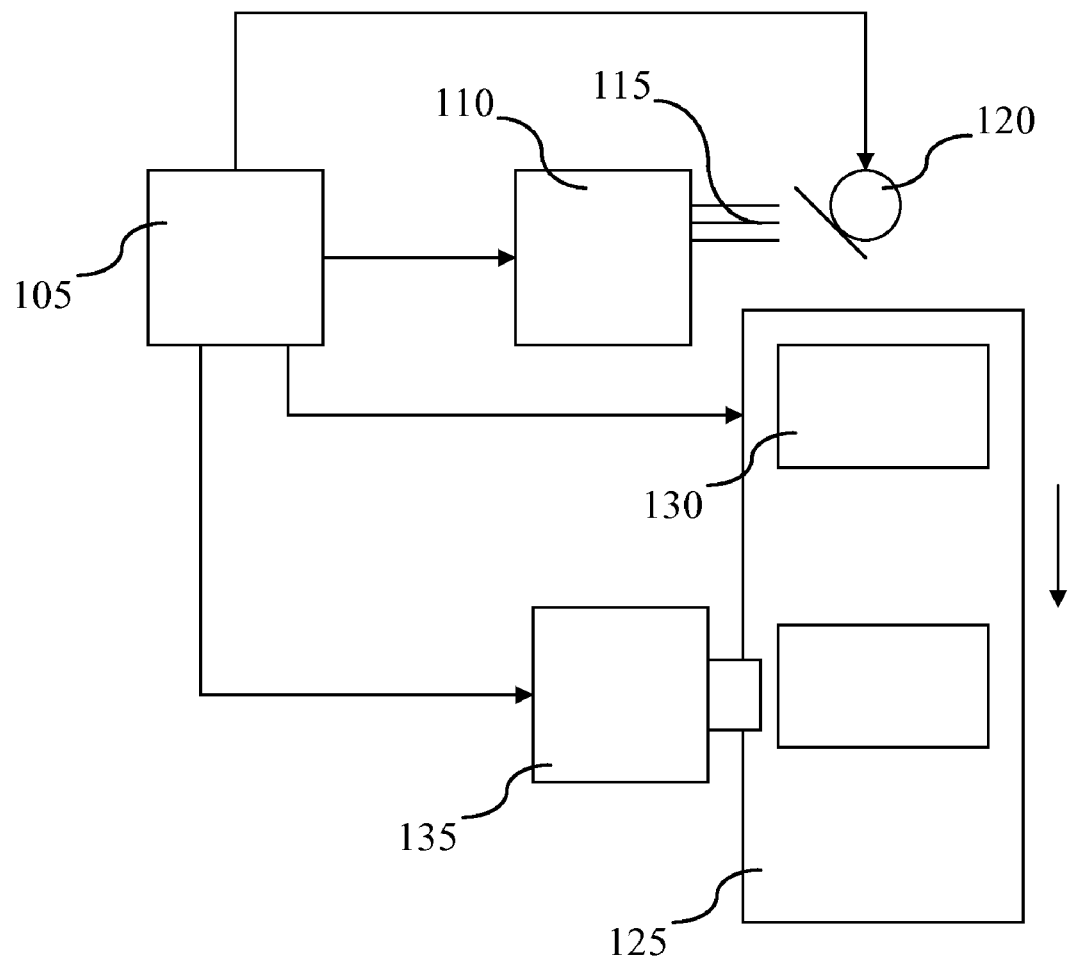

This invention concerns a method and a device for marking objects and materials. It concerns, in particular, the field of the fight against counterfeits and parallel imports.

There are many techniques of visible markings of materials intended to be incorporated into the packaging of products, for example watches, containers of products, for example perfumes, or products. However, because they are visible, these marks are removed by malicious people who wish to parallel import these products.

Techniques are also known for marking with invisible ink, which can be read with optical systems utilizing wavelengths outside the visible spectrum. However, these inks are sensitive to heat or radiation and it is therefore easy to degrade them so that the marks formed disappear.

The aim of the present invention is to remedy these drawbacks.

To this end, the present invention envisages, according to a first aspect, a material marking method, which comprises:
 a step of generating a code,
 a step of randomly selecting at least one area of said material and
 a step of marking by laser shot on the surface of said material or inside said material in each said area of the material to represent said code there in a way that cannot be detected by the naked eye.

In this way, the information represented is coded, the marking area varies and the code marked is invisible and not degraded by heat or any radiation whatsoever. A parallel import product can therefore be identified and, conversely, it is very bothersome to falsify it.

According to particular features, the step of randomly selecting at least one area of the material is performed for each item of material to be marked.

Thanks to these provisions, two marked materials from the same batch do not have the invisible code in the same position, which increases the difficulty in falsifying them.

According to particular features, during the step of generating a code, a two-dimensional bar code is generated and during the step of marking said two-dimensional bar code is represented.

Thanks to these provisions, a lot of information can be coded in the invisible code.

According to particular features, said material constitutes a metal, plastic or ceramic item.

Thanks to these provisions, the material can be constituted of a mold and all the items molded with this mold will have better robustness to falsification than items molded with an unmarked mold.

According to particular features, during the step of marking, the material is engraved to a depth of less than five micrometers.

According to particular features, during the step of marking, in order to realize a mark formed of dots, a laser shot is carried out with a duration of less than ten picoseconds for each dot of the mark.

According to particular features, during the step of marking, the largest dimension of each dot is less than 50 micrometers.

Thanks to each of these provisions, the mark is small, quick to realize and does not alter the material in depth.

According to particular features, the method as described in brief above further comprises a step of marking said material in order to represent a mark on it that is visible to the naked eye.

Thanks to these provisions, the advantages of a visible mark, which allows it to be read quickly, can be combined with those of the invisible code, difficult to locate and falsify.

According to particular features, during the step of randomly selecting at least one area of said material, at least one part of a marking area of a mark visible to the naked eye is selected randomly.

According to particular features, said visible mark bears an item of information representative of the position of at least one area where the code that cannot be detected by the naked eye is represented.

Thanks to these provisions, those who have means for reading the visible mark can quickly find the position of the invisible code and verify the authenticity and provenance of the material according to this invisible code.

According to particular features, during the step of randomly selecting at least one area of said material, at least one part of a printed area is selected randomly.

Thanks to these provisions, when you try to falsify or destroy the invisible code you damage the printed area and, as a result, what it signifies, for example, the logo, the mark or the characteristics of the product incorporating the material.

According to particular features, the method as described in brief above further comprises a step of marking by laser shot on the surface of the material or inside the material in an area of predetermined position in order to represent said code there in a way that cannot be detected by the naked eye.

Thanks to these provisions, at least one of the invisible codes is in a random position and another invisible code is in a known position, the second being able to be read quickly and the first serving as backup, in case the first is destroyed.

According to particular features, during said step of marking by laser shot, a single laser pulse and an array optical modulator, on which said code is represented, are utilized.

According to particular features, during said step of marking by laser shot, a movement system using a galvanometer mirror, whose configuration depends on the area selected randomly, is utilized.

Thanks to each of these provisions, the laser marking is rapid.

This invention envisages, according to a second aspect, a material marking device, which comprises:
 a generating means for generating a code,
 a selecting means for randomly selecting at least one area of said material and
 a marking means for marking by laser shot on the surface of said material or inside said material in each said area of the material to represent said code there in a way that cannot be detected by the naked eye.

As the particular characteristics, advantages and aims of this device are similar to those of the method as briefly described above, they are not repeated here.

Figure 2:
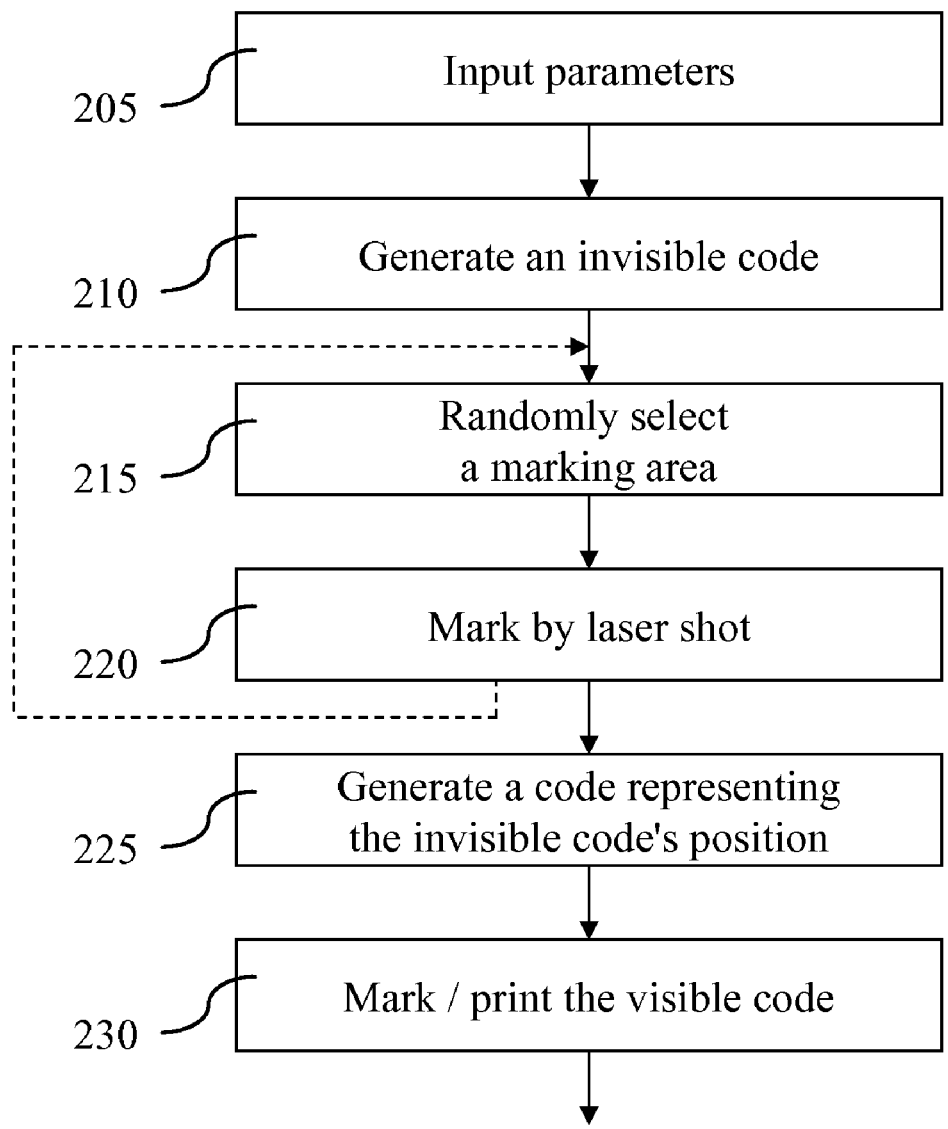
Figure 3:
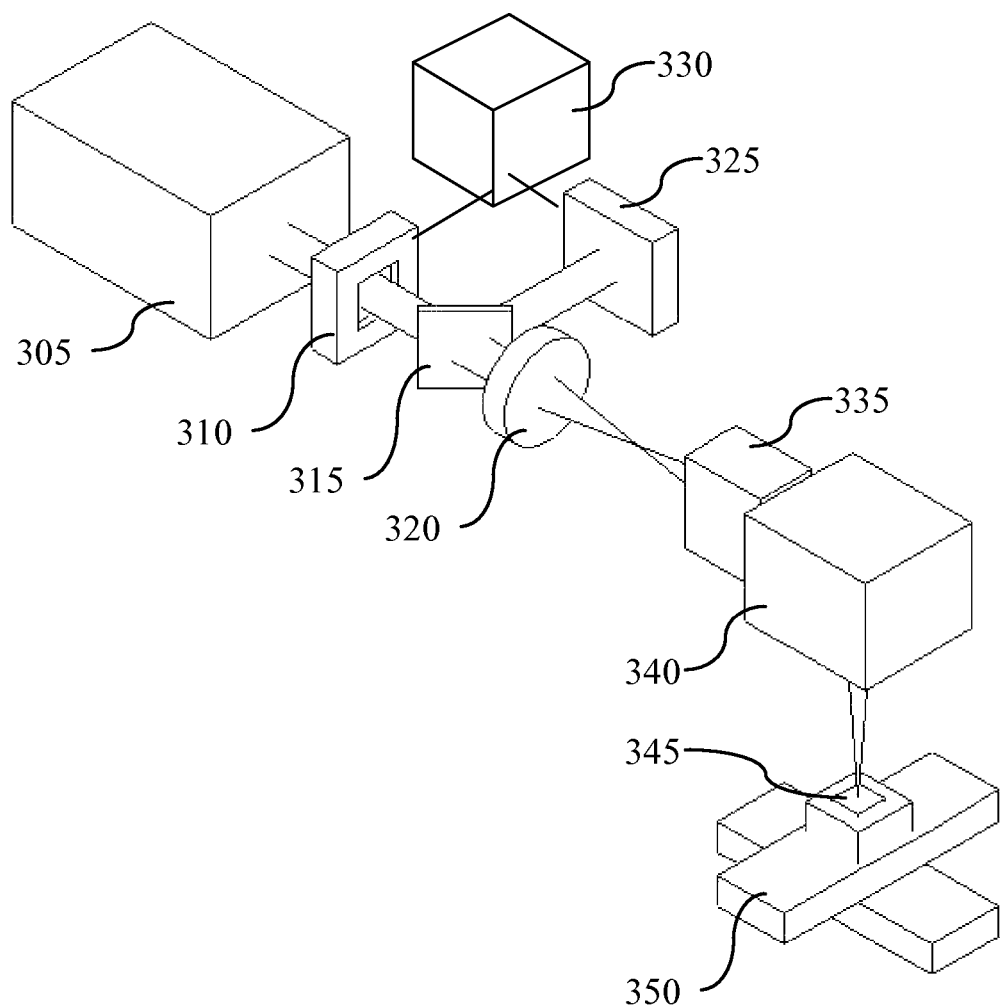
Figure 4:
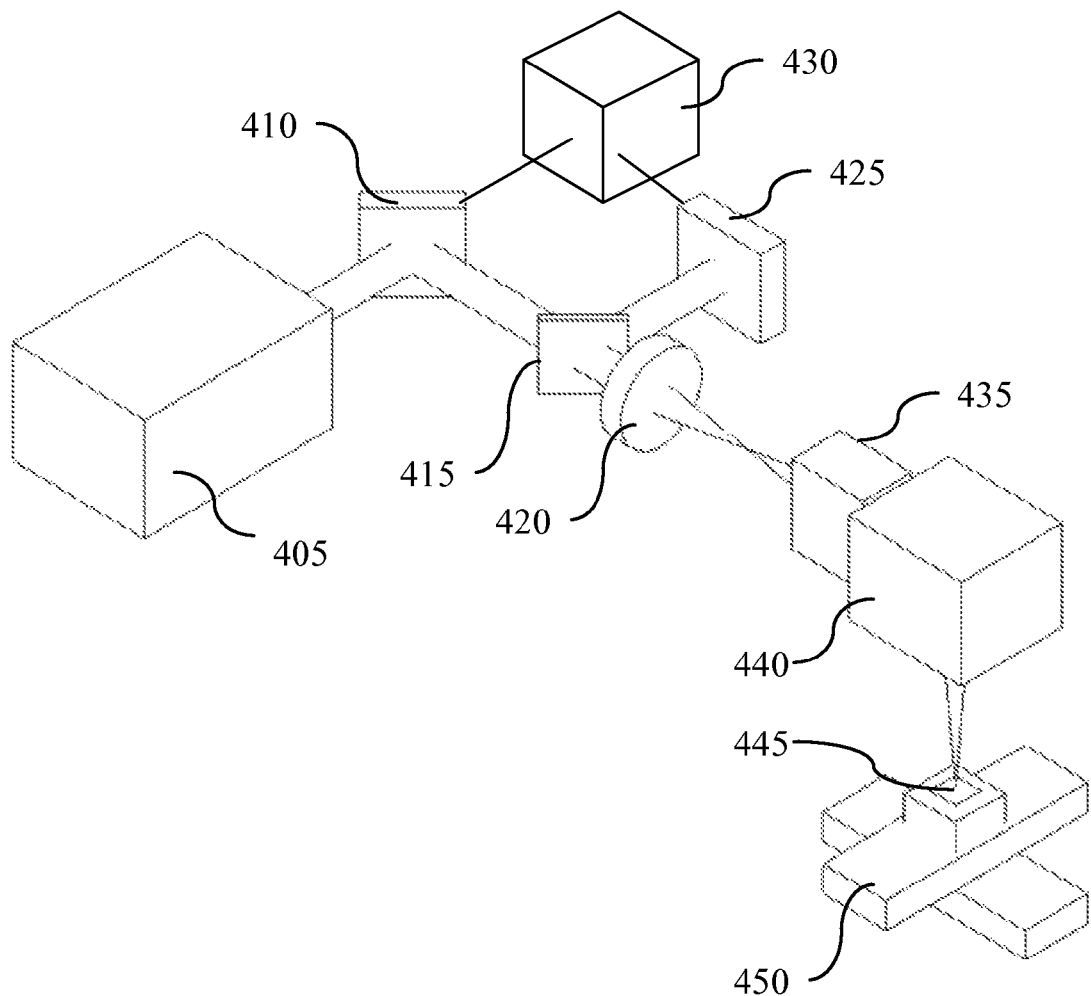

Other advantages, aims and characteristics of this invention will become apparent from the description that will follow, made, as an example that is in no way limiting, with reference to the drawings included in an appendix, in which:

FIG. 1 represents, schematically, a first particular embodiment of the device that is the subject of this invention, FIG. 2 represents, in the form of a flowchart, steps implementing a particular embodiment of the method that is the subject of this invention, FIG. 3 represents, schematically, a second particular embodiment of the device that is the subject of this invention and FIG. 4 represents, schematically, a third particular embodiment of the device that is the subject of this invention.

FIG. 1 shows a computer system 105, a laser ray generator 110 equipped with optical fibers 115, galvanometer mirrors 120, a conveyor 125 of items of material 130 and an ink-jet printer 135.

The laser ray generator is designed, under the control of the computer system 105, to carry out laser shots on the surface of the material or inside the material in order to represent there any symbol or any code supplied by the computer system 105 in a way that cannot be detected by the naked eye.

For example, in the case of marking metal, plastic or ceramic items, for example in the case of a mold, the laser ray generator 110 preferentially engraves the material to a depth of less than five micrometers in order to realize a mark formed of dots, with a laser shot with a duration of less than ten picoseconds for each dot of the mark, the largest dimension of every dot being less than 50 micrometers.

In embodiments, a single laser pulse and an array optical modulator, or matrix light valve, operating by reflection (see FIG. 4) or by transmission (see FIG. 3), for example liquid crystal, on which said code is represented, is utilized in order to form each invisible code. The modulator or valve thus plays the role of a mask that can be reconfigured between two laser shots in order to successively represent the different codes.

The computer system 105 is of a known type and has software systems for generating codes, random selection software system, software systems for controlling the laser ray generator, controlling the positions of galvanometer mirrors, controlling the ink-jet printer 135 and controlling the conveyor 125.

The random selection software generates random number pairs within predetermined limits, these random number pairs corresponding to coordinates on an item of material 130. Preferentially, this software selects a pair of random numbers for each mark to be engraved with the laser on each product item.

In particular embodiments, the random selection software generates pairs of random numbers in a set of pairs corresponding to predetermined areas, for example areas where logos, marks, description or text are present or in a print area of the ink-jet printer.

The code generation software uses data relating to the date, marking position, the item's type and model and the holders of intellectual property rights concerning the item, for example, in order to generate, with a secret key, two encrypted codes, one being destined to be marked on the material by laser marking and the other to be marked on the material by ink-jet printing.

Preferentially, these codes take the form of two-dimensional anti-copy authentication bar codes, or datamatrix.

Preferentially, at least the code destined to be marked on the material by ink-jet printing is dependent on each random number pair corresponding to the item of material to be marked.

The software systems controlling the laser ray generator and controlling the positions of galvanometer mirrors are designed to carry out the marking of the item of material, with the code destined to be marked by laser marking, in each position defined by a pair of random numbers supplied by the random selection software.

In particular embodiments, the software systems controlling the laser ray generator and controlling the positions of galvanometer mirrors are also designed to carry out the marking of the item of material, with the code destined to be marked by laser marking, in a predetermined position.

The software system controlling the ink-jet printer 135 causes the printing, on an item of material, of the code destined to be printed corresponding to this item, it being noted that if the ink-jet printer 135 is offset with reference to the generator 110 and consequently cannot print, at the same time as the laser marking, the same item as the generator 110, a buffer memory keeps the code to be printed until the item is in front of the ink-jet printer 135.

The software system controlling the conveyor 125 sets the conveyor in motion between two periods of marking an item and printing the same item or another item.

Thus, the material marking device that is the subject of this invention comprises:
- a generating means for generating a code,
- a selecting means for randomly selecting at least one area of said material and
- a marking means for marking by laser shot on the surface of said material or inside said material in each said area of the material to represent said code there in a way that cannot be detected by the naked eye.

FIG. 2 shows that, in an embodiment, the method that is the subject of this invention comprises, firstly, a step 205 of inputting code parameters and parameters of possible positions of invisible codes on an item of material. According to variants, the possible positions concern the entire item of material or solely one part of the item, for example the printed areas, especially the logos and marks, or a marking area of a visible code.

During a step 210, a code is generated that is destined to be marked, by laser marking, in an invisible way. Preferentially, a two-dimensional bar code is generated, in order to code a lot of information in the invisible code.

During a step 215, at least one area of said material is randomly selected in the possible areas for the laser marking of an invisible code. Preferentially, the random selection step 215 is carried out for each item of material to be marked so that two items of material in the same batch do not have the invisible code in the same position, which increases the difficulty in falsifying them.

During a step 220, a marking is carried out by laser shot on the surface of the material or inside the material in each selected area, in order to represent said code there in a way that cannot be detected by the naked eye. It is noted that the information represented is coded, the marking area varies and the code marked, invisible, is not degraded by heat or any radiation whatsoever. The utilization of this invention thus makes it possible to identify a parallel import product and, conversely, it is very bothersome to falsify it.

It is noted that, especially in the case where the material constitutes a metal, plastic or ceramic item, for example a mold, so that all the items molded with this mold have better robustness to falsification than items molded with an unmarked mold, during the marking step 220, the material is engraved to a depth less than five micrometers with a laser shot with a duration of less than ten picoseconds for each dot of the invisible mark, the largest dimension of every dot being less than 50 micrometers. Thus, the code's mark is small, quick to realize and does not alter the material in depth.

In other cases, during the laser shot marking step 220, a single laser pulse and an array optical modulator, on which said code is represented, are utilized.

In particular embodiments, during the laser shot marking step 220, a movement system using a galvanometer mirror, whose configuration is dependent on the area randomly selected during step 215, is utilized.

It is noted that steps 215 and 220 can be repeated several times for the same item of material and that in one of the repetitions, at least, step 215 can be omitted so that the position of the invisible code is predetermined. In this latter case, at least one of the invisible code markings is in a random position and another invisible code marking is in a known position, the second being able to be read quickly and the first serving as backup, in case the first is destroyed.

During a step 225, a code is generated representative of the invisible code's content and its position on the item of material, said code being destined to be marked in a visible way on the item of material.

During a step 230, the item of material is marked in order to represent a mark on it that is visible to the naked eye representing the code generated during step 225. In this way, the advantages of a visible mark, which allows it to be read quickly, can be combined with those of the invisible code, difficult to locate and falsify. Reading the visible mark, when this is possible, allows you to quickly find the position of the invisible code and verify the authenticity and provenance of the material according to this invisible code. When it is not possible to read the visible mark, for example because the visible mark has been deliberately altered or removed, reading the invisible mark allows the authenticity of the item of material to be verified after retrieving this invisible mark.

FIG. 3 shows a laser source 305, a matrix light valve 310, a partially reflective strip 315, an objective lens 320, a photosensitive sensor 325, a processor 330, a scanner 335 and 340, an object to be marked 345 and a positioning table 350.

The laser source 305 is of a known type. The matrix light valve 310 is a transmissive type. It is designed to filter the light rays coming from the laser source 305, on certain points of its surface, in order to form an image. The partially reflective strip 315 is, for example, a strip of glass with anti-reflective treatment on one of its surfaces. It reflects a portion, for example five percent, of the light from the matrix light valve 310 onto the photosensitive sensor 325. The processor 330 applies closed-loop control on the transparency of the optical valve 310, utilizing a negative feedback loop.

The objective lens 320 and each optical lens (not shown) incorporated in the scanner 335 and 340 make it possible to focus the image obtained on output from the matrix light valve 310 onto the surface of the object 345 so as to mark it with the image formed by the matrix light valve 310, possibly reversed by internal reflections inside the scanner 335 and 340 and by the lenses located on the optical path of the light rays.

The scanner 335 and 340 comprises two galvanometer mirrors (not shown) allowing the image to be positioned on the object to be marked 345, according to two axes.

The positioning table 350 performs, at least, movements according to one axis and, preferably, according to six degrees of freedom (three orthogonal translations and three orthogonal axis rotations) so as to position the object to be marked with respect to the image formed on its surface.

The matrix light valve 310, the mirrors of the scanner 335 and 340 and the movements of the positioning table 350 are controlled by a computer system (not shown), for example the computer system 105 shown in FIG. 1.

FIG. 4 shows a laser source 405, a matrix light valve 410, a partially reflective strip 415, an objective lens 420, a photosensitive sensor 425, a processor 430, a scanner 435 and 440, an object to be marked 445 and a positioning table 450.

The laser source 405 is of a known type. The matrix light valve 410 is a reflective type. It is designed to filter the light rays coming from the laser source 405, on certain points of its surface, in order to form an image. The partially reflective strip 415 is, for example, a strip of glass with anti-reflective treatment on one of its surfaces. It reflects a portion, for example five percent, of the light from the matrix light valve 410 onto the photosensitive sensor 425. The processor 430 applies closed-loop control on the transparency of the optical valve 410, utilizing a negative feedback loop.

The objective lens 420 and each optical lens (not shown) incorporated in the scanner 435 and 440 make it possible to focus the image obtained on output from the matrix light valve 410 onto the surface of the object 445 so as to mark it with the image formed by the matrix light valve 410, possibly reversed by internal reflections inside the scanner 435 and 440 and by the lenses located on the optical path of the light rays.

The scanner 435 and 440 comprises two galvanometer mirrors (not shown) allowing the image to be positioned on the object to be marked 445, according to two axes.

The positioning table 450 performs, at least, movements according to one axis and, preferably, according to six degrees of freedom (three orthogonal translations and three orthogonal axis rotations) so as to position the object to be marked with respect to the image formed on its surface.

The matrix light valve 410, the mirrors of the scanner 435 and 440 and the movements of the positioning table 450 are controlled by a computer system (not shown), for example the computer system 105 shown in FIG. 1.

The invention claimed is:

1. A material marking method, that comprises:
   a step of generating a code;
   a step of selecting at least one area of said material among a plurality of areas;
   a step of marking by laser shot on the surface of said material or inside said material in each said selected area of the material to represent said code there in a way that cannot be detected by the naked eye; and
   a step of visibly marking said material in order to represent a mark on it that is visible to the naked eye, wherein said visible mark bears an item of information representative of the position of at least one selected area where the code that cannot be detected by the naked eye is represented.

2. The material marking method according to claim 1, wherein the step of selecting at least one area of the material is performed for each item of material to be marked.

3. The material marking method according to claim 1 wherein, during the step of generating a code, a two-dimensional bar code is generated and during the step of marking said two-dimensional bar code is represented.

4. The material marking method according to claim 1 wherein, said material constitutes a metal, plastic or ceramic item.

5. The material marking method according to claim 1 wherein, during the step of marking, the material is engraved to a depth of less than five micrometers.

6. The material marking method according to claim 1 wherein, during the step of marking, in order to realize a mark formed of dots, a laser shot is carried out with a duration of less than ten picoseconds for each dot of the mark.

7. The material marking method according to claim 6, wherein, during the step of marking, the largest dimension of each dot is less than 50 micrometers.

8. The material marking method according to claim 1, wherein, during the step of selecting at least one area of said material, at least one part of a marking area of a mark visible to the naked eye is selected randomly.

9. The material marking method according to claim 1 wherein, during the step of selecting at least one area of said material, at least one part of a printed area is selected.

10. The material marking method according to claim 1 that further comprises a step of marking by laser shot on the surface of the material or inside the material in an area of predetermined position in order to represent said code there in a way that cannot be detected by the naked eye.

11. The material marking method according to claim 1 wherein, during at least one step of marking by laser shot, a single laser pulse and an array optical modulator, on which said code is represented, are utilized.

12. The material marking method according to claim 1 wherein, during at least one step of marking by laser shot, a movement system using a galvanometer mirror, whose configuration depends on the area selected, is utilized.

13. A material marking device, that comprises:
- a generating means for generating a code;
- a selecting means for selecting at least one area of said material among a plurality of areas;
- a marking means for marking by laser shot on the surface of said material or inside said material in each said selected area of the material to represent said code there in a way that cannot be detected by the naked eye; and
- a marking means for visibly marking said material in order to represent a mark on it that is visible to the naked eye, wherein said visible mark bears an item of information representative of the position of at least one area where the code that cannot be detected by the naked eye is represented.

14. The material marking device according to claim 13, wherein the means for selecting at least one area of the material is configured to select at least one area for each item of material to be marked.

15. The material marking device according to claim 13 wherein the means for generating a code is configured to generate a two-dimensional bar code and the means for marking said two-dimensional bar code is configured to represent said bar code on the surface of the material or inside the material in the selected area.

16. The material marking device according to claim 13 that further comprises a means for marking by laser shot on the surface of the material or inside the material in an area of predetermined position in order to represent said code there in a way that cannot be detected by the naked eye.

* * * * *